US011969966B2

(12) United States Patent
Spörke et al.

(10) Patent No.: US 11,969,966 B2
(45) Date of Patent: Apr. 30, 2024

(54) DEVICE AND METHOD FOR APPLYING A PROTECTIVE ELEMENT TO A PACKAGING

(71) Applicant: HOMAG Automation GmbH, Lichtenberg (DE)

(72) Inventors: Sebastian Spörke, Lichtenberg (DE); Jens Ludwig, Lichtenberg (DE)

(73) Assignee: HOMAG Automation GmbH, Lichtenberg (DE)

( * ) Notice: Subject to any disclaimer, the term of this patent is extended or adjusted under 35 U.S.C. 154(b) by 936 days.

(21) Appl. No.: 16/964,180

(22) PCT Filed: Jan. 22, 2019

(86) PCT No.: PCT/EP2019/051448

§ 371 (c)(1),
(2) Date: Jul. 22, 2020

(87) PCT Pub. No.: WO2019/145275

PCT Pub. Date: Aug. 1, 2019

(65) Prior Publication Data

US 2021/0031479 A1 Feb. 4, 2021

(30) Foreign Application Priority Data

Jan. 23, 2018 (DE) ........................ 102018200988.0

(51) Int. Cl.

| | |
|---|---|
| ***B65B 55/20*** | (2006.01) |
| ***B31B 50/04*** | (2017.01) |
| *B31B 105/00* | (2017.01) |
| *B31B 120/40* | (2017.01) |

(52) U.S. Cl.
CPC .......... *B31B 50/04* (2017.08); *B31B 2105/00* (2017.08); *B31B 2120/40* (2017.08); *B65B 55/20* (2013.01)

(58) Field of Classification Search
CPC ..................................................... B65B 55/20
See application file for complete search history.

(56) References Cited

U.S. PATENT DOCUMENTS 4,707,965 A 11/1987 Becker
5,022,217 A 6/1991 Vilas et al.
(Continued)

FOREIGN PATENT DOCUMENTS

CN 102264602 11/2011
CN 102633030 8/2012
(Continued)

OTHER PUBLICATIONS

Light Industry Press, Light Industry Packing Technology, Dec. 1988, p. 194, Common Knowledge Evidence (in Chinese).

*Primary Examiner* — Jeffry H Aftergut
(74) *Attorney, Agent, or Firm* — Nathan S. Smith; Morgan, Lewis & Bockius LLP

(57) ABSTRACT

The invention relates to a device and a method for applying a protective element to a packaging. A packaging may be, for example, a cardboard box or a folding box, in or into which one or more objects may be placed. Such an object may be an element from the furniture and component industry, in particular one or more furniture parts, such as floor panels, boards, cabinet elements, furniture accessories or the like.

13 Claims, 2 Drawing Sheets

(56) References Cited

U.S. PATENT DOCUMENTS

| | | | | |
|---|---|---|---|---|
| 5,829,231 | A * | 11/1998 | Harding .................. | B65B 55/20<br>53/139.5 |
| 6,643,992 | B2 * | 11/2003 | Esnault .................. | B65D 77/26<br>53/238 |
| 2002/0062627 | A1 | 5/2002 | Esnault et al. | |
| 2002/0104293 | A1 * | 8/2002 | Armington ............. | B65B 57/12<br>53/472 |
| 2008/0239048 | A1 | 10/2008 | Albrecht et al. | |
| 2013/0081360 | A1 | 4/2013 | Smith et al. | |

FOREIGN PATENT DOCUMENTS

| | | | |
|---|---|---|---|
| CN | 202480448 | | 10/2012 |
| CN | 104302549 | | 1/2015 |
| CN | 205150461 | | 4/2016 |
| CN | 105773607 | | 7/2016 |
| CN | 106742313 | | 5/2017 |
| DE | 3532839 | A1 | 3/1987 |
| DE | 60121401 | T2 | 2/2007 |
| DE | 202012004391 | U1 | 6/2012 |
| DE | 102013202401 | A1 | 8/2014 |
| EP | 1974928 | A1 | 10/2008 |
| EP | 2682344 | B1 | 1/2014 |
| JP | H 09-132218 | | 5/1997 |
| WO | WO-2010076026 | A1 | 7/2010 |
| WO | WO-2016059595 | A1 | 4/2016 |

* cited by examiner

DEVICE AND METHOD FOR APPLYING A PROTECTIVE ELEMENT TO A PACKAGING

TECHNICAL FIELD

The invention relates to a device and a method for applying a protective element to a packaging. A packaging may be, for example, a cardboard box or a folding box, in or into which one or more objects may be placed. Such an object may be an element from the furniture and component industry, in particular one or more furniture parts, such as floor panels, boards, cabinet elements, furniture accessories or the like.

PRIOR ART

As regards packaging for packing furniture parts, it is known to apply a protective element in the region of the end faces of the packaging (so-called end edge protection). Such a protective element can be made from a cardboard section. The protective element serves to reinforce certain sections of the packaging in a targeted manner in order to provide additional protection for the objects contained therein during transport and, for example, to prevent the packaging from tearing open in this region.

Known from DE 10 2013 202 401 A1 is a device for loading cardboard boxes, said device comprising a supply unit for supplying an outer packaging blank and a folding unit for forming an outer packaging from the outer packaging blank supplied by the supply unit. The loading unit for arranging a packaging part on the inside of the outer packaging may comprise a handling device, in particular a robot, so that one, preferably two, handling devices can arrange the packaging part in the outer packaging.

The packaging parts are stored at one or more supply points and are then placed, for example by means of a robot, into the open cardboard box, i.e. the outer packaging, at an insertion point. The parts can alternatively also be inserted into the outer packaging directly after folding without intermediate storage.

SUBJECT MATTER OF THE INVENTION

An object of the invention is to provide a device and a method with which a larger number of packagings can be processed per unit of time and/or which can be integrated in a packing line in an advantageous manner.

The subject matter of claim 1 provides a corresponding device. Further preferred embodiments are specified in the dependent claims. The invention furthermore relates to a method. The dependent device claims can each individually be combined with the independent method claim. The same applies to the features of the dependent method claims with regard to the independent device claim.

The invention provides a device comprising: A conveying device for moving a packaging, for example a cardboard box or a folding box, and a handling device with a holding portion for applying a protective element to the packaging. The handling device and/or the holding portion is/are movable in accordance with the movement of the packaging in order to apply the protective element to the packaging moved by means of the conveying device.

Thus, according to a first alternative, the handling device can be moved. According to a second alternative, the holding portion of the handling device is moved, whereas the handling device is arranged so as to be stationary. As a further alternative, the handling device and the holding portion thereof can be moved.

Since the protective element can be applied to the packaging whilst the packaging is moving, it is possible to process a high number of packagings per unit of time. Furthermore, the device according to the invention can combine a conveying device for moving a packaging with a handling device in an advantageous manner. By means of the holding portion of the handling device, a protective element can be applied at various positions of a packaging, for example, at the front or the rear in the throughput direction.

According to one embodiment, the device can be provided as a modular component in a packing line, at the end of which the packaging is filled with one or more objects and closed if required. The packaging can thereby be conveyed in a continuous manner.

If the packaging is a cardboard box or a folding box, it may be folded from a blank into a box so that one or more objects can be accommodated therein.

According to one embodiment, a plurality of differently positioned handling devices are provided for applying protective elements at different points of the packaging. In this manner, it is possible to react to specific requirements (for example higher cycle rate).

It is furthermore preferred that the handling device, in particular the holding portion of the handling device, can apply a plurality of protective elements at one or more points of the packaging. It is therefore possible that a plurality of protective elements can be applied to the packaging perpendicular to the direction of transport.

It is preferred that the packaging is moved in an open state when applying the protective element. The objects) to be inserted into the packaging can be placed into the packaging after the protective element has been applied thereto.

A protective element can be a single or multi-ply corrugated cardboard, a honeycomb board, a styrofoam element, a cardboard section, or the like. The protective element serves to protect a specific area, in particular an end face, of the packaging.

According to one embodiment, it is provided that the holding portion is configured to apply the protective element to an inner end face of the packaging. It is thus possible to reinforce the packaging on an inner side and thus prevent transport damage.

It is preferred that the handling device comprises a counterpressure portion, with it being preferred that the counterpressure portion is pivoted towards an outer side of the packaging. By means of the counterpressure portion, a counterpressure can be applied to the packaging when applying the protective element in order to press the protective element against the packaging.

The handling device may be movable along a guide device, in particular a rail. It is therefore possible to move the handling device adjacent to the conveying device in accordance with the movement of the packaging.

It is preferred that the holding portion is pivotable relative to a base of the handling element. In this manner, the holding portion that picks up the protective element can be guided to the moving packaging.

The conveying device may comprise a speed detection device, by means of which the speed of movement of the packaging can be determined. For example, if the conveying device is configured as a roller conveyor, the rotational speed of the driving rollers is determined. A control device can control the movement of the handling device and/or the holding portion based on the determined speed of the packaging.

According to one embodiment, it is provided that the device comprises a feed device that is configured to move protective elements into a pick-up area of the handling device. It is thereby preferred that the feed device can separate the protective elements. For example, the feed device can be configured as a belt conveyor.

An adhesive application device may be provided in the region of the feed device, which is configured to individually provide the protective elements conveyed by the feed device with an adhesive on one of the sides thereof. Alternatively, an activation device for activating an adhesive may be provided. It is therefore possible to provide an adhesion-promoting layer just before processing the protective element.

The device may comprise a second handling device that is arranged, for example, downstream of the first handling device in the direction of transport of the packaging, with it being preferred that a second feed device is also provided, which is configured to move protective elements into a pick-up area of the second handling device. Thus, one of the handling devices can provide a front end face with a protective element, whereas the respective other handling device is provided to provide the rear end face with a protective element. In this manner, a particularly efficient process flow can be implemented and a high throughput can be achieved.

It is preferred that the conveying device comprises lateral belts that can come into contact with sides of the packaging. A slip-free conveying of the packaging can be ensured in this manner.

The invention furthermore relates to a method for applying a protective element to a packaging. The packaging may be a cardboard box or a folding box. The protective element is, for example, a cardboard section, a single or multi-ply corrugated cardboard, a honeycomb board or a styrofoam element.

The method comprises the steps of: Moving a packaging in a transport direction, picking up a protective element by means of a holding portion of a handling device, synchronising a movement of the handling device and/or the holding portion with the movement of the packaging, and applying the protective element to the packaging.

Since the protective element can be applied whilst the packaging is moving, it is possible to process a high number of packagings per unit of time.

It is preferred that the protective element is applied to an inner end face of the packaging. The packaging can thus be reinforced in a targeted manner and the contents thereof protected.

The protective element is provided with an adhesive before being applied to the packaging, or an adhesive applied to the protective element is activated. An efficient process flow is ensured in this manner. It is thereby preferred that the adhesive is applied or activated before the protective element is picked up by the holding portion. The adhesive can thus already form a bond with the protective element before the protective element is applied to the packaging.

When applying the protective element to the packaging, a counterpressure can be applied to the corresponding section of the packaging so that the protective element can be pressed against the packaging. This ensures a secure connection between the protective element and the packaging.

The speed of movement of the packaging can be determined based on the conveying speed of the conveying device moving the packaging. Light barriers or optical image recognition are, for example, provided in the region of the conveying device. The movement of the handling device and/or the holding portion can be adjusted based on the conveying speed of the packaging.

DETAILED DESCRIPTION OF THE PREFERRED EMBODIMENT

A preferred embodiment of the invention will be explained by means of the enclosed figures. Modifications described in this regard may each be combined with further features of the embodiment in order to constitute further embodiments of the invention.

Figure 1:
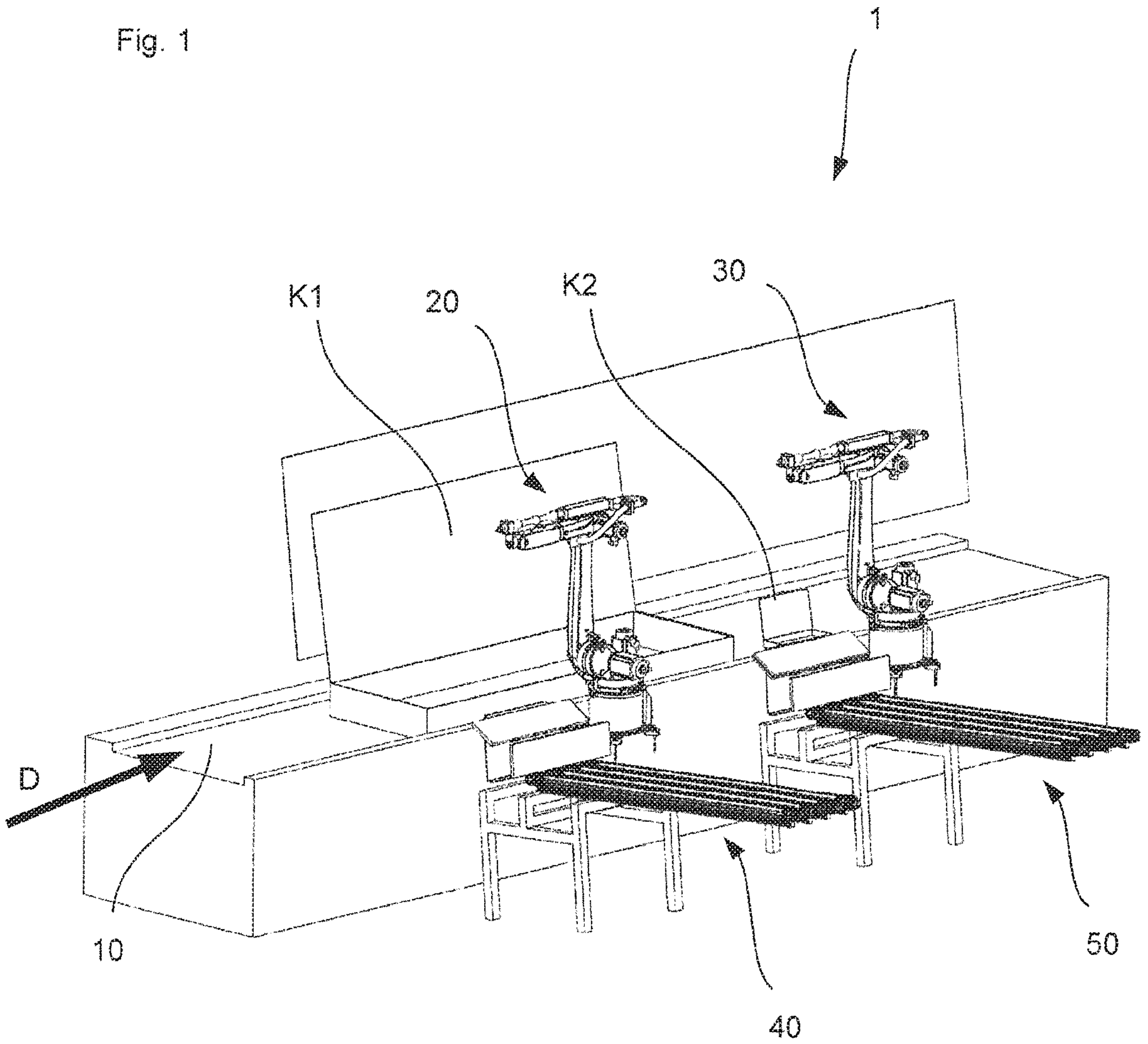
FIG. 1 is a schematic view of an embodiment of the invention.

FIG. 1 shows a device 1 for processing a packaging K1, K2. The packaging in question here is a folded box that is used, for example, for packaging furniture parts. The dimensions of the packagings can vary according to the different dimensions of the objects to be packaged. Two differently dimensioned packagings K1, K2 are shown in FIG. 1 in order to illustrate this by means of a clear example.

The device 1 comprises a conveying device 10. The conveying device 10 comprises a roller conveyor with a plurality of rollers, each arranged adjacent to one another. By moving at least some of the rollers of the roller conveyor, a packaging K1, K2 is moved in a direction of transport D by means of the conveying device 10.

According to the embodiment, lateral belts are provided in a side region of the rollers of the conveying device 10, between which the packaging K1 can be clamped and thereby conveyed almost without slippage. Since the transport speed of the rollers is determined or predetermined and the lateral belts ensure a slip-free conveying movement, the position of the respective packaging K1, K2 during the conveying movement is known.

A first handling device 20, which is configured as a robot arm, is located on one side of the conveying device 10. A second handling device 30 which, like the first handling device, is configured as a robot, is also provided on one side of the conveying device 10 downstream of the first handling device 20 in the direction of transport D.

The handling devices 20, 30 can be arranged next to the conveying device 10, as is the case in the embodiment example. According to a further modification, the handling devices 20, 30 are mounted in a vertical direction above the conveying device 10.

In the embodiment shown here, the handling devices 20, 30 are each attached at the side of the conveying device 10.

According to a further embodiment, the handling devices 20, 30 can be moved along a guide device (not shown), in particular a rail.

Device 1 further comprises a first feed device 40 that is configured as a belt conveyor. The first feed device 40 is provided close to the first handling device 20 and is configured to feed individual protective elements (front edge protection) S1 into the region of the first handling device 20. The protective elements can each be individually provided and/or cut to size according to requirements and can be moved by means of the first teed device 40 into a region of the first handling device 20.

Device 1 furthermore comprises a second feed device 50 that is configured to feed individual protective elements into the region of the second handling device 30. The second feed device 50 is arranged close to the second handling device 30 and is configured as a belt conveyor.

Although the feed devices 40, 50 according to the embodiment are configured in a similar manner, it can be provided according to a modification to configure the feed devices 40, 50 in different manners in order to feed different protective elements.

An adhesive application device (not shown) is provided in the region of the first and second feed device 40, 50, which is configured to individually provide the protective elements S conveyed by the respective feed device 40, 50 with an adhesive on one of the sides thereof. The adhesive is applied at a point in time shortly before the respective protective element S is picked up by the respective handling device 20, 30.

According to a modification, the protective elements are already provided with an adhesion-promoting layer, which is activated in the region of the respective feed device 40, 50 or after the protective element has been picked up by one of the handling devices 20, 30.

Figure 2A:
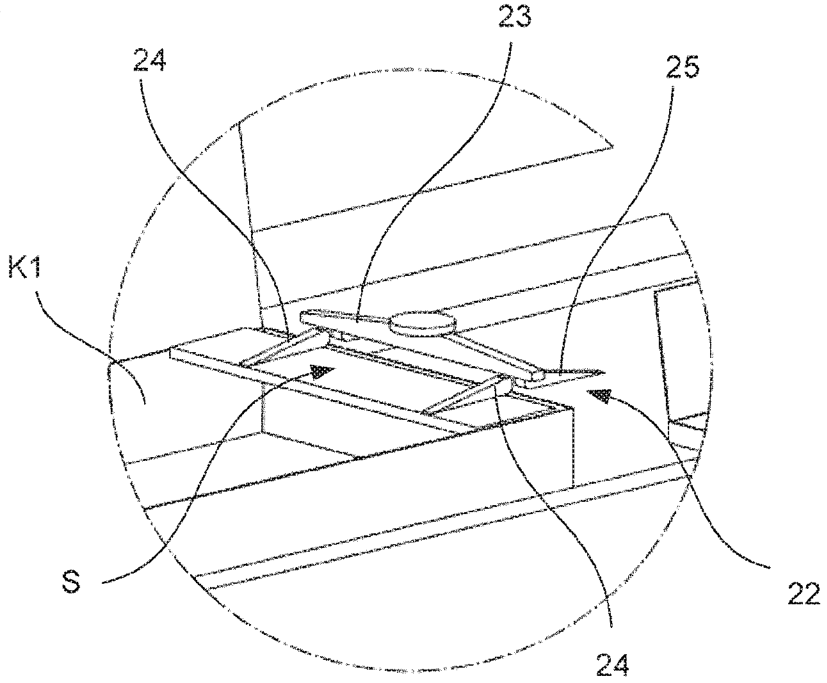
FIG. 2*a* shows a detailed view at a point in time before a protective element is placed in the packaging.
Figure 2B:
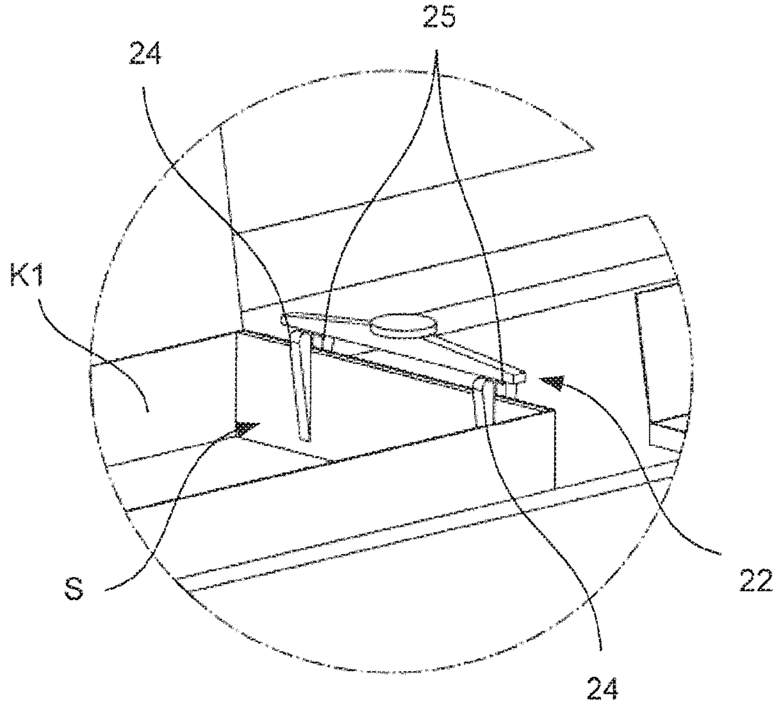
FIG. 2*b* shows a detailed view during the application of the protective element.

The first handling device 20 is shown in detail in FIG. 2*a*. The configuration of the second handling device 30 is similar to the first handling device 20 shown in FIG. 2*a*. Therefore, only the first handling device 20 will be described in the following.

The first handling device 20 comprises a robot arm 21 and a handling element 22 attached to the robot arm 21 for handling a protective element S. The handling element 22 comprises a holding portion 24 which can be pivoted relative to a base 23 of the handling element 22 and is configured to pick up and at least temporarily hold a protective element S. Openings can, for example, be provided on the pivotable holding portion 24 so that in order to hold a protective element S, a negative pressure is provided which holds the protective element S on the pivotable holding portion 24.

The handling element 22 furthermore comprises a counterpressure portion 25, which is also provided such that it is pivotable to the base 23 of handling element 22. The counterpressure portion 25 can thereby be moved in the opposite direction to the pivoting movement of the holding portion 24.

According to the embodiment, the counterpressure portion 25 is dimensioned and configured in a similar manner to the holding portion 24. The dimensions of the counterpressure portion 25 and the holding portion 24 can be variable, in particular in width, in order to adapt them to differently dimensioned packagings K1, K2.

In a basic position, the holding portion 24 is essentially aligned horizontally. By means of a pivoting movement of the holding portion 24, the protective element S can be inserted into a packaging K1, K2, whereas by means of a corresponding pivoting movement in the opposite direction, the counterpressure portion 25 is positioned on an outer side of the packaging K1, K2.

If the protective element S is pressed against the inside of the packaging K1 by the holding portion 24, a counterpressure can be built up by means of the counterpressure portion 25 so that the protective element S can be securely pressed against the inside of the packaging K1. The interaction of the holding portion 24 and the counterpressure portion 25 thus allows the protective element S, which is provided with an adhesive, to be quickly attached to the inside of the packaging K1, K2.

An example process flow will be explained in the following in order to further describe the embodiment by means of a clear example.

The empty, pre-folded packaging (cardboard box or folding box) is first of all placed on the conveying device 10 and continuously transported by the conveying device 10. The packaging is clamped by the lateral belts so that it can be conveyed without slippage. The control device thus always knows the position of the conveyed packaging.

In a first feed device 40, a protective element S is separated and subsequently provided with an adhesive, in particular at certain points. The first handling device 20 takes the protective element S and pivots it into a region above the packaging moved by the conveying device 10.

During or after this, the first handling device 20 is synchronised to the speed of movement of the packaging so that the first handling device moves in accordance with the speed of movement of the packaging.

When a synchronous movement as been achieved, the protective element S is pivoted by means of the handling element 22 to the packaging K1 and by the holding portion 24 to the inside of the front face of the packaging K1 in the direction of transport D. The counterpressure portion 25 is furthermore guided into the region of the outside of packaging K1.

During the movement of the cardboard box and the synchronised movement of the first handling device 20, the protective element S is pressed against the inside of the packaging K1. Once a defined pressure application time has elapsed, the holding portion 24 and the counterpressure portion 25 are pivoted back into the basic position. The handling device 20 is subsequently stopped and moved back to its starting position.

Once the protective element S has been applied by means of the first handling device 20, a further protective element S is applied by means of the second handling device 30 to the inside of the rear end face of the packaging K1 in the direction of transport D. The second handling device 30 thereby carries out similar work steps to the first handling device 20.

According to the embodiment, the movements of the first and second handling devices 20, 30 are coordinated with one another so that the corresponding process flows are intertwined and a higher cycle rate is possible.

According to the embodiment, it is provided that the first handling device 20 provides a front end face of the packaging with a protective element S, whereas the second handling device 30 is provided for a rear end face of the packaging. However, according to a modification of the embodiment, the first handling device 20 can be provided for the rear end face of the packaging and the second handling device 30 can be provided for the front face of the packaging.

The invention claimed is:

1. Method for applying a protective element to a packaging, comprising the steps of:

moving a packaging in a transport direction, picking up a protective element by means of a holding portion of a handling device, synchronising a movement of the handling device and/or the holding portion with the movement of the packaging, applying a counterpressure, opposite the holding portion, to the packaging, and when the counterpressure is applied to the packaging, applying the protective element to the packaging.

2. Method according to claim 1, wherein the protective element is applied to an inner side of the packaging, and wherein a plurality of protective elements are applied to the packaging by the handling device or by a plurality of handling devices.

3. Method according to claim 1, wherein the protective element is provided with an adhesive before being applied to the packaging or an adhesive applied to the protective element is activated, and wherein the application or activation of the adhesive takes place before the protective element is picked up by the holding portion.

4. Method according to claim 1, wherein the speed of movement of the packaging is determined based on the conveying speed of the conveying device moving the packaging.

5. Method according to claim 1, wherein the protective element is a cardboard section, a single or multi-ply corrugated cardboard, a honeycomb board or a styrofoam element, and/or the packaging is a cardboard box or folding box.

6. Device, comprising:

a conveying device for moving a packaging, a handling device with a holding portion for applying a protective element to the packaging, and a counterpressure portion that is configured to cooperate with the holding portion when applying the protective element to the packaging, the counterpressure portion being configured to be pivoted to an outer side of the packaging, wherein the handling device and/or the holding portion is movable in accordance with the movement of the packaging in order to apply the protective element to the packaging moved by means of the conveying device.

7. Device according to claim 6, wherein the holding portion is configured to apply the protective element to an inner side of the packaging, wherein the handling device with the holding portion is configured to apply a plurality of protective elements at one or more points of the packaging.

8. Device according to claim 6, wherein the handling device is movable along a guide device and the holding portion is movable relative to the handling device.

9. Device according to claim 6, wherein the holding portion is pivotable relative to a base of the handling element.

10. Device according to claim 6, wherein the conveying device comprises a speed detection device, by means of which the speed of movement of the packaging can be determined.

11. Device according to claim 6, wherein the device comprises a feed device that is configured to move protective elements into a pick-up area of the handling device, and the feed device is configured as a belt conveyor.

12. Device according to claim 6, wherein the device comprises a second handling device, and wherein a second feed device is furthermore provided, which is configured to move protective elements into a pick-up area of the second handling device.

13. Device according to claim 6, wherein the conveying device comprises lateral belts that can come into contact with sides of the packaging.

* * * * *